(12) United States Patent
Fu et al.

(10) Patent No.: US 6,427,191 B1
(45) Date of Patent: *Jul. 30, 2002

(54) HIGH PERFORMANCE FULLY DUAL-PORTED, PIPELINED CACHE DESIGN

(75) Inventors: John Wai Cheong Fu, Saratoga; Dean A. Mulla, San Jose; Gregory S. Mathews, Santa Clara, all of CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/224,420

(22) Filed: Dec. 31, 1998

(51) Int. Cl.[7] .............................................. G06F 12/00
(52) U.S. Cl. ...................... 711/131; 711/154; 711/168; 711/169
(58) Field of Search ................................ 711/131, 168, 711/154, 146, 3, 169, 118

(56) References Cited

U.S. PATENT DOCUMENTS

| | | | | |
|---|---|---|---|---|
| 5,091,845 A | * | 2/1992 | Rubinfeld | 711/118 |
| 5,434,989 A | * | 7/1995 | Yamaguchi | 711/3 |
| 5,561,781 A | * | 10/1996 | Braceras et al. | 711/131 |
| 5,640,534 A | * | 6/1997 | Liu et al. | 711/146 |
| 5,675,765 A | * | 10/1997 | Malamy et al. | 711/146 |
| 5,752,269 A | * | 5/1998 | Divivier et al. | 711/169 |
| 5,878,245 A | * | 3/1999 | Johnson et al. | 711/154 |

* cited by examiner

*Primary Examiner*—Matthew Kim
*Assistant Examiner*—B. R. Peugh
(74) *Attorney, Agent, or Firm*—Schwegman, Lundberg, Woessner & Kluth P.A.

(57) ABSTRACT

A novel on-chip cache memory and method of operation are provided which increase microprocessor performance. The cache design allows two cache requests to be processed simultaneously (dual-ported) and concurrent cache requests to be in-flight (pipelined). The design of the cache allocates a first clock cycle to cache tag and data access and a second cycle is allocated to data manipulation. The memory array circuit design is simplified because the circuits are synchronized to the main processor clock and do not need to use self-timed circuits. The overall logic control scheme is simplified because distinct cycles are allocated to the cache functions.

23 Claims, 4 Drawing Sheets

HIGH PERFORMANCE FULLY DUAL-PORTED, PIPELINED CACHE DESIGN

FIELD OF THE INVENTION

The present invention relates generally to the field of electronic data processing devices. More particularly, the present invention relates to microprocessor on-chip cache memories.

BACKGROUND OF THE INVENTION

Many computer systems today use cache memories to improve the speed of access to more frequently used data and instructions. A small cache memory may be integrated on a microprocessor chip itself, thus, greatly improving the speed of access by eliminating the need to go outside the microprocessor chip to access data or instructions from an external memory.

During a normal data accessing routine, the microprocessor will first look to an on-chip cache memory to see if the desired data or instructions are resident there. If they are not, the microprocessor will then look to one or more off-chip memories. On-chip memory, or cache memory, is smaller than main memory. Multiple main memory locations may be mapped into the cache memory. The main memory locations, or addresses, which represent the most frequently used data and instructions get mapped into the cache memory. Cache memory entries must contain not only data, but also enough information ("tag address and status" bits) about the address associated with the data in order to effectively communicate which external, or main memory, addresses have been mapped into the cache memory. To improve the percentage of finding the memory address in the cache (the cache "hit ratio") it is desirable for cache memories to be set associative, e.g., a particular location in memory may be stored in multiple ways in the cache memory.

Most previous cache designs, because of their low frequency, can afford a relatively large cache, e.g. a cache which contains both integer data and larger floating point data. In lower frequency microprocessors, a relatively large cache could still have an access latency of a single clock cycle. However, as microprocessor frequencies and instruction issue width increases the cache access latency can become greater than two clock cycles.

One approach to improving the performance of an on-chip cache includes dual porting and pipelining the cache. Previous cache designs which are dual-ported and pipelined have complex, and costly, self-timed circuits to correctly align memory and tag array access. The addition of self-timed circuits, expends valuable processor space which could otherwise be used for a larger cache capacity. Moreover, complex control schemes are used in these designs since distinct clock cycles are not allocated to the separate cache functions of "cache lookup" and "data manipulation."

For the reasons stated above, and for other reasons stated below which will become apparent to those skilled in the art upon reading and understanding the present specification, it is desirable to develop improved performance for cache memory.

SUMMARY OF THE INVENTION

The present invention includes a novel cache design that allows two cache requests to be processed simultaneously (dual-ported) and concurrent cache requests to be in-flight (pipelined). The cache design includes a first cache memory stage adapted for cache data access. At least two address ports are coupled to the first cache memory stage. Each address port is adapted to provide an input for a cache address on a first clock cycle of a processor clock signal. The cache design includes a second cache memory stage adapted for cache data manipulation. The second cache memory stage is adapted to receive cache data corresponding to cache data address found in the first cache memory stage in a second clock cycle of the processor clock signal. Thus, the design of the cache allocates the first clock cycle to cache tag and data access and the second clock cycle is allocated to data manipulation.

In an alternative embodiment, a method for accessing a cache memory is provided. The method includes receiving a first cache address into a first cache memory stage at a first address port in a first clock cycle. A second cache address is received into the first cache memory stage at a second address port in the first clock cycle. A first data set corresponding to the first cache address is provided to a second cache memory stage in a second clock cycle. The method further includes providing a second data set corresponding to the second cache address to the second cache memory stage in the second clock cycle.

DETAILED DESCRIPTION

A novel cache memory which has improved cache functionality is provided. In the following detailed description numerous specific details are set forth in order to provide a thorough understanding of the invention. However, it will be understood by those skilled in the art that the present invention may be practiced without these specific details. In other instances well known methods, procedures, components, and circuits have not been described in detail so as not to obscure the present invention.

Figure 1:
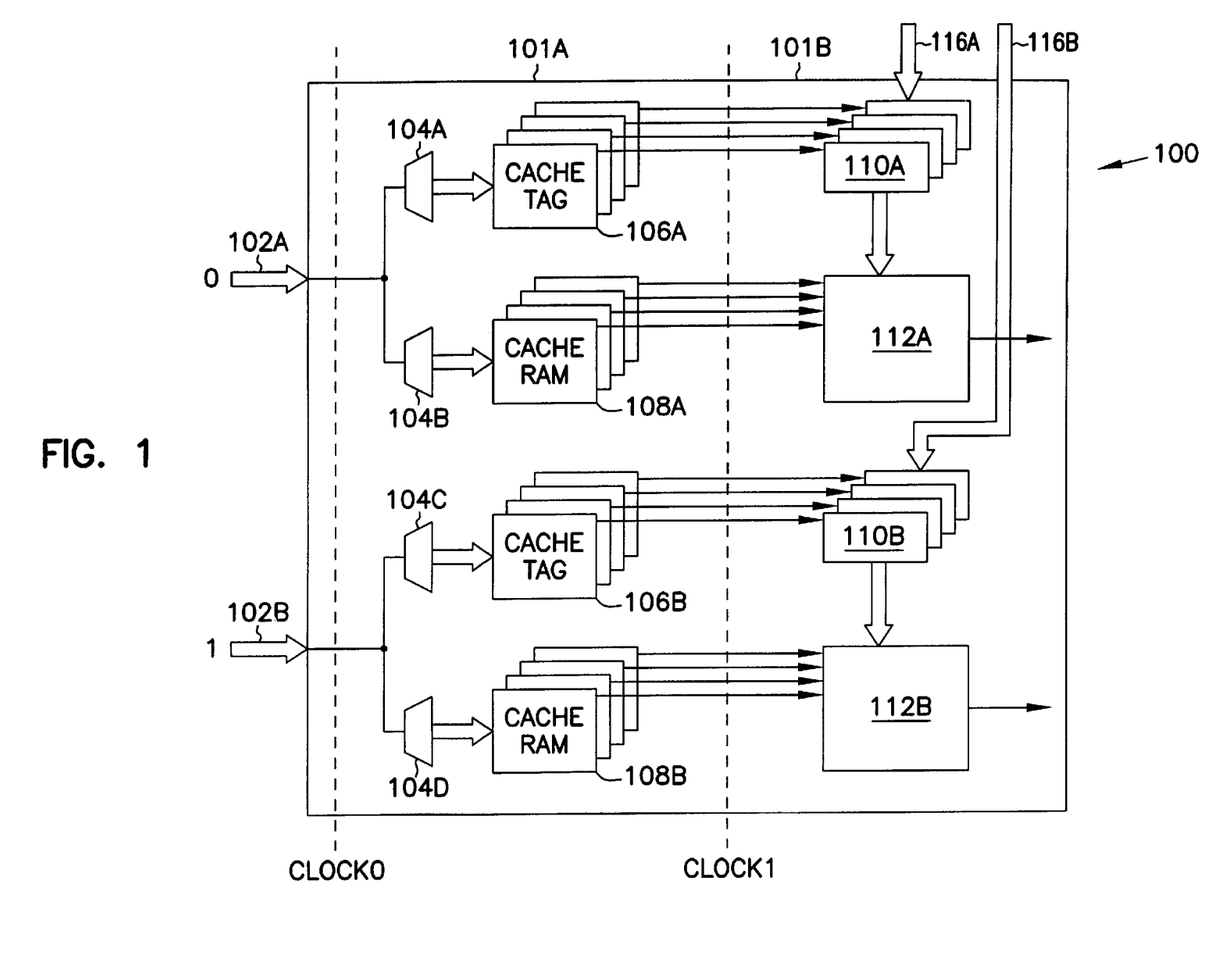
FIG. 1 is a block diagram illustrating an embodiment of a cache memory according to the teachings of the present invention.

FIG. 1 is a block diagram illustrating an embodiment of a cache memory 100 according to the teachings of the present invention. FIG. 1 illustrates that the cache memory 100 includes a first cache memory stage 101A and a second cache memory stage 101B. The first cache memory stage 101A is adapted for cache data access. The second cache memory stage 101B is adapted for cache data manipulation. The cache memory 100 includes at least two address ports, shown in FIG. 1 as first address port 102A and a second address port 102B. Each address port, 102A and 102B is coupled to the first cache memory stage 101A and is adapted to provide an input for a cache address on a first clock cycle (clock 0) from a processor clock. The second cache memory stage 101B is adapted to receive cache address data from the first cache data stage in a second clock cycle (clock 1) from the processor clock. The cache address data received in the second cache memory stage 101B is physical address data received on lines 116A and 116B from a first and second translation look aside buffer (not shown) after a translation of corresponding virtual cache addresses provided to the first address port 102A and the second address port 102B. In one embodiment, the first address port 102A and the second address port 102B simultaneously provide input for a first cache address and a second cache address. In this embodiment, the first cache memory stage 101A is designed to concurrently process the first cache address and the second cache address. That is, the first cache memory stage 101A includes circuitry which is adapted to simultaneously initiate a cache "lookup" of the first cache address and the second cache address.

As shown in FIG. 1, the circuitry in the first cache memory stage 101A includes a first decoder 104A and a second decoder 104B coupled to the first address port 102A. The first decoder 104A is coupled to a first cache TAG 106A. The first decoder 104A decodes the first cache address from the first address port 102A for the first cache TAG 106A. The first cache TAG 106A provides "tag address and status" bits to the first cache hit/miss logic 110A. The second decoder 104B is coupled to a first cache RAM 108A. The second decoder 104B similarly decodes the first cache address from the first address port for the first cache RAM 108A. The first cache RAM 108A provides data to the first data manipulation block 112A. The circuitry in the first cache memory stage 101A further includes a third decoder 104C and a fourth decoder 104C coupled to the second address port 102B. The third decoder 104C is coupled to a second cache TAG 106B. The third decoder 104C decodes the second cache address from the second address port 102B for the second cache TAG 106B. The second cache TAG 106B provides "tag address and status" bits to the second cache hit/miss logic 110B. The fourth decoder 104D is coupled to a second cache RAM 108B. The fourth decoder 104D similarly decodes the second cache address from the second address port 102B for the second cache RAM 108B. The second cache RAM 108B provides data to the second data manipulation block 112B. One of ordinary skill in the art of cache memory architecture will understand upon reading this disclosure the manner in which such circuitry may be configured to simultaneously initiate the cache lookup of the first cache address and the second cache address. In this embodiment, a first cache address provided by the first address port 102A and a second cache address provided by the second address port 102B are concurrently in-flight (pipelined) in the cache memory 100. In this embodiment, the cache lookup function of first cache memory stage 101A occurs in a first clock cycle (clock 0) from the processor clock.

FIG. 1 illustrates that the second cache memory stage 101B includes circuitry adapted to perform a cache data manipulation function. The circuitry in the second cache memory stage 101B couples tag address and status bits from the first cache TAG 106A and physical addresses received on line 116A to a first cache hit/miss logic 110A. Cache hit/miss logic 110A compares the cache tag address bits and the physical data and qualifies it with the tag status bits to determine a cache hit signal for each cache way. The cache way hit signals are then provided to a first data manipulation block 112A. The first data manipulation block 112A contains logic circuitry for way selecting, aligning and bi-endian swapping the first data set provided by first cache RAM 108A. One of ordinary skill in the art will understand from reading this disclosure the manner in which these functions may be performed and organized as part of the first data manipulation block 112A. The circuitry in the second cache memory stage 101B couples tag address and status bits from the second cache TAG 106B and physical addresses received on line 116B to a second cache hit/miss logic 110B. The second cache hit/miss logic 110B compares the cache tag address bits and the physical data and qualifies it with the tag status bits to determine a cache hit signal for each cache way. The cache way hit signals are then provided to a second data manipulation block 112B. The second data manipulation block 112B contains logic circuitry for way selecting, aligning and bi-endian swapping the second data set provided by second cache RAM 108B. One of ordinary skill in the art will understand from reading this disclosure the manner in which these functions may be performed and organized as part of the second data manipulation block 112B. In one embodiment, data manipulation of the first data set and the second data set are performed in the first data manipulation block 112A and the second data manipulation block 112B in parallel. In this embodiment, the data manipulation function of second cache memory stage 101B occurs in a second clock cycle (clock 1) from the processor clock.

Figure 2:
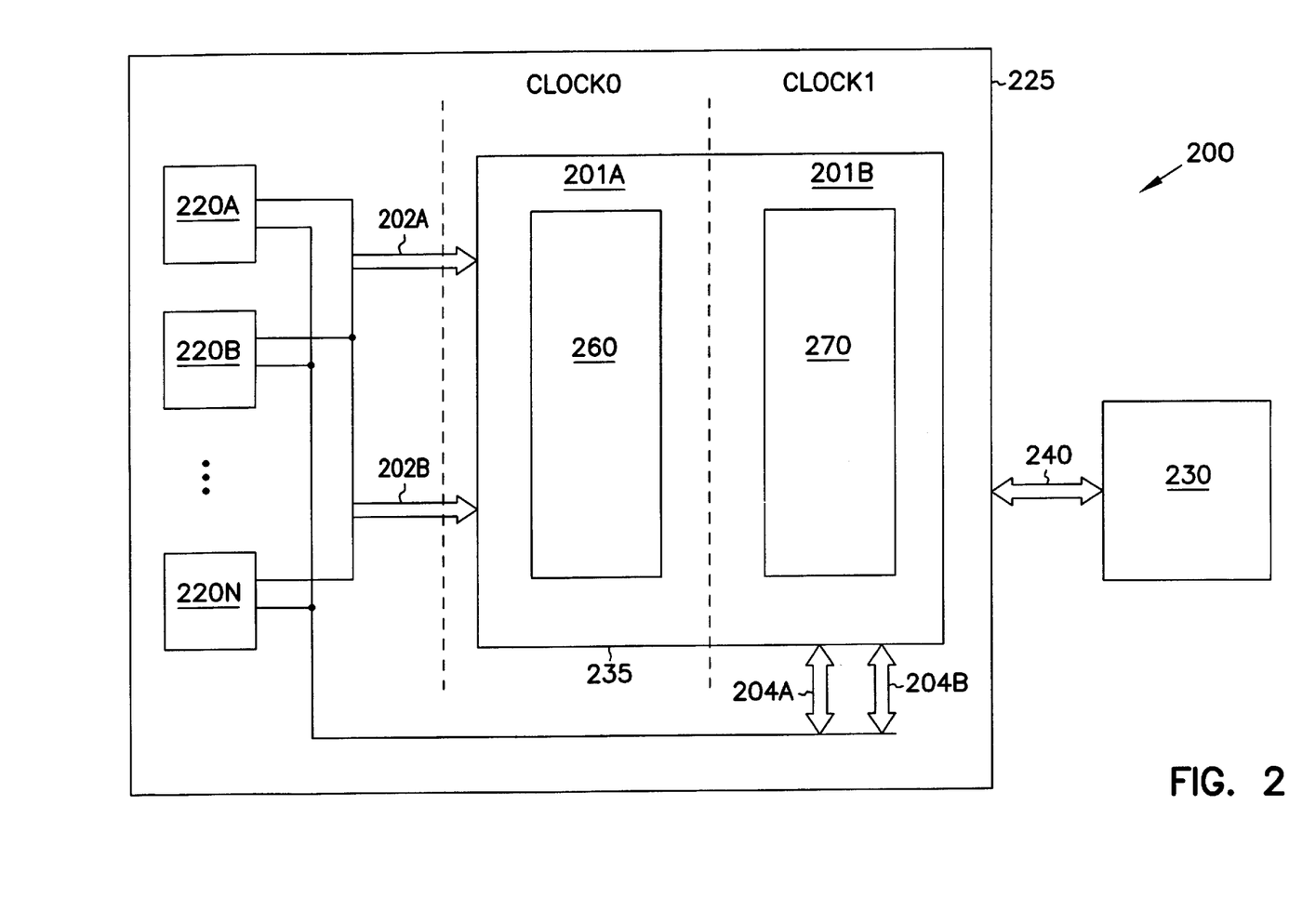
FIG. 2 is a block diagram illustrating an embodiment of a computer system according to the teachings of the present invention.

FIG. 2 is a block diagram illustrating an embodiment of a computer system 200 according to the teachings of the present invention. FIG. 2 illustrates that the computer system 200 includes a microprocessor chip 250 which is operated according to a processor clock. The microprocessor chip 250 is capable of decoding and executing a computer program such as an application program or operating system with instructions for multiple instruction sets. The microprocessor chip 250 includes a number of execution units, shown as 220A, 220B . . . , 220N. The microprocessor chip includes an on-chip cache memory 235. The on-chip cache memory 235 includes the cache memory described above in connection with FIG. 1. As explained in connection with FIG. 1, the on-chip cache memory 235 includes a first cache memory stage 201A and a second cache memory stage 201B. In one embodiment, the first cache memory stage 201A is adapted for cache data access and includes cache data access circuitry 260. In one embodiment, the second cache memory stage 201B is adapted for cache data manipulation and includes data manipulation circuitry 270. The first cache memory stage 201A and the second cache memory stage 210B are synchronized by the processor clock. In one embodiment, cache data access circuitry 260 of the first cache memory stage 201A is aligned to a first processor clock cycle and the data manipulation circuitry of the second cache memory stage 201B is aligned to a second processor clock cycle. In this embodiment, the second cache memory stage 201B is adapted to output a cache data set in the second processor clock cycle. In another embodiment, the second cache memory stage 201B is adapted to output a first manipulated data set and a second manipulated data set in the second processor clock cycle. The cache memory 100 includes at least two address busses, shown in FIG. 1 as first address bus 202A and a second address bus 202B. Each address bus, 202A and 202B is coupled to the first cache memory stage 201A at an address port and is adapted to couple address data from the number of execution units, 220A, 220B . . . , 220N, to the on-chip cache memory 235. In one embodiment, the first address bus 202A and the second address bus 202B simultaneously provide a first data address and a second data address to the first cache memory stage 201A. The cache memory 100 includes at least two data busses, shown in FIG. 2 as first data bus 204A and a second data bus 204B. Each data bus, 204A and 204B is coupled to the on-chip cache memory 235 and is adapted to couple data sets between the on-chip cache memory 235 and the number of execution units, 220A, 220B ..., 220N. In one embodiment, a first data bus 204A couples a first cache data with one of the number of execution units, 220A, 220B ..., 220N and a second data bus 204B simultaneously couples a second data set with another one of the number of execution units, 220A, 220B ..., 220N. In one embodiment, the first address bus 202A and the second address bus 202B are adapted to lookup a first cache line and a second cache line, respectively, from the first cache memory stage 201A in a first processor clock cycle. In this embodiment, a first data set and a second data set are provided to the second cache memory stage 201B in a second processor clock cycle. The computer system 200 includes a main memory subsystem 230, or memory chip 230. The main memory subsystem 230 can include dynamic random access memory (DRAM), static random access memory (SRAM), flash type memory, or other alternative memory types. A bus 240 couples the main memory subsystem 230 to the microprocessor chip 225. The bus 240 can include a single bus or a combination of multiples buses. As an example, bus 240 can comprise an industry standard architecture (ISA) bus, an extended industry standard architecture (EISA) bus, a system bus, a x-bus, ps/2 bus, a peripheral components interconnect (PCI) bus, a personal computer memory card international association (PCMCIA) bus, or other buses. Bus 240 can also comprise combinations of any buses.

Figure 3:
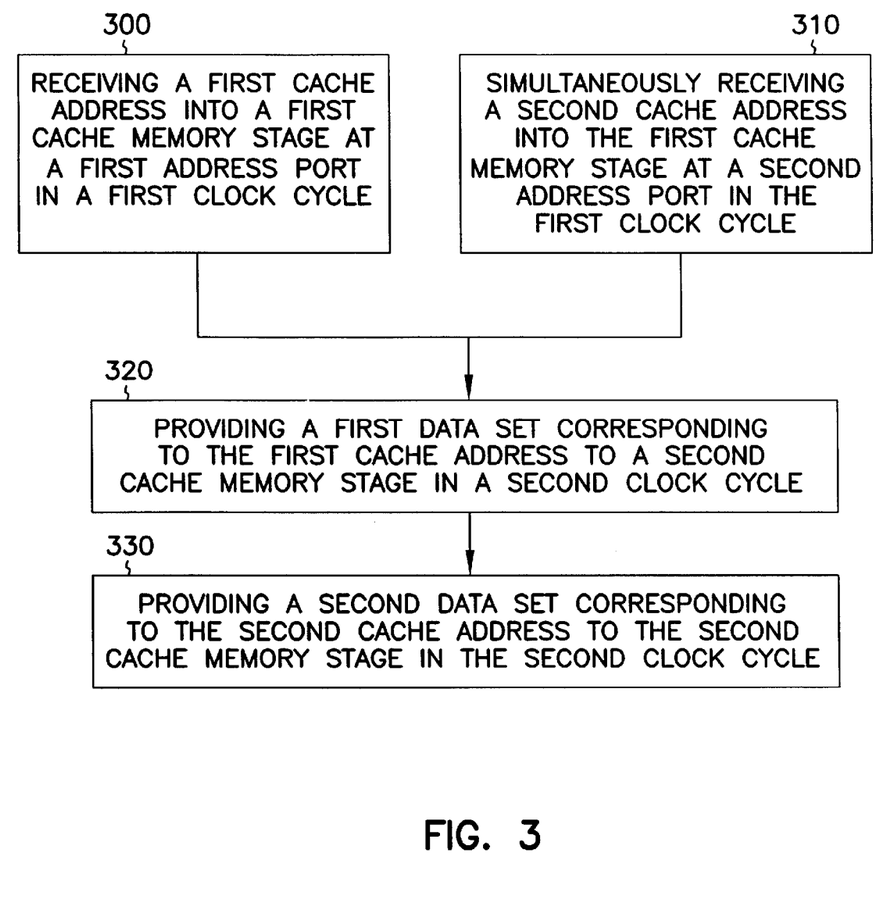
FIG. 3 illustrates, in flow diagram form, a method for accessing a cache memory according to the teachings of the present invention.

FIG. 3 illustrates, in flow diagram form, a method for accessing a cache memory according to the teachings of the present invention. As shown in FIG. 3 the method includes receiving a first cache address into a first cache memory stage at a first address port in a first clock cycle 300. A second cache address is simultaneously received into the first cache memory stage at a second address port in the first clock cycle 310. The method includes providing a first data set corresponding to the first cache address to a second cache memory stage in a second clock cycle 320. The method further includes providing a second data set corresponding to the second cache address to the second cache memory stage in the second clock cycle 330.

In one embodiment of the method of FIG. 3, receiving a first cache address and a second cache address in the first clock cycle includes aligning the first clock cycle to a processor clock. In another embodiment of the method of FIG. 3, receiving the first cache address and receiving the second cache address into the first cache memory stage includes accessing a first data address and accessing a second data address in the first clock cycle.

In one embodiment of the method of FIG. 3, providing the first data set and the second data set to the second cache memory stage includes manipulating the first data set and second data set in the second clock cycle. In this embodiment, the method further includes outputting a first manipulated data set in the second clock cycle and outputting a second manipulated data set in the second clock cycle. In still another embodiment of the method of FIG. 3, the method includes pipelining a first cache line from a first execution unit to the cache memory with a second cache line from the first execution unit.

Figure 4:
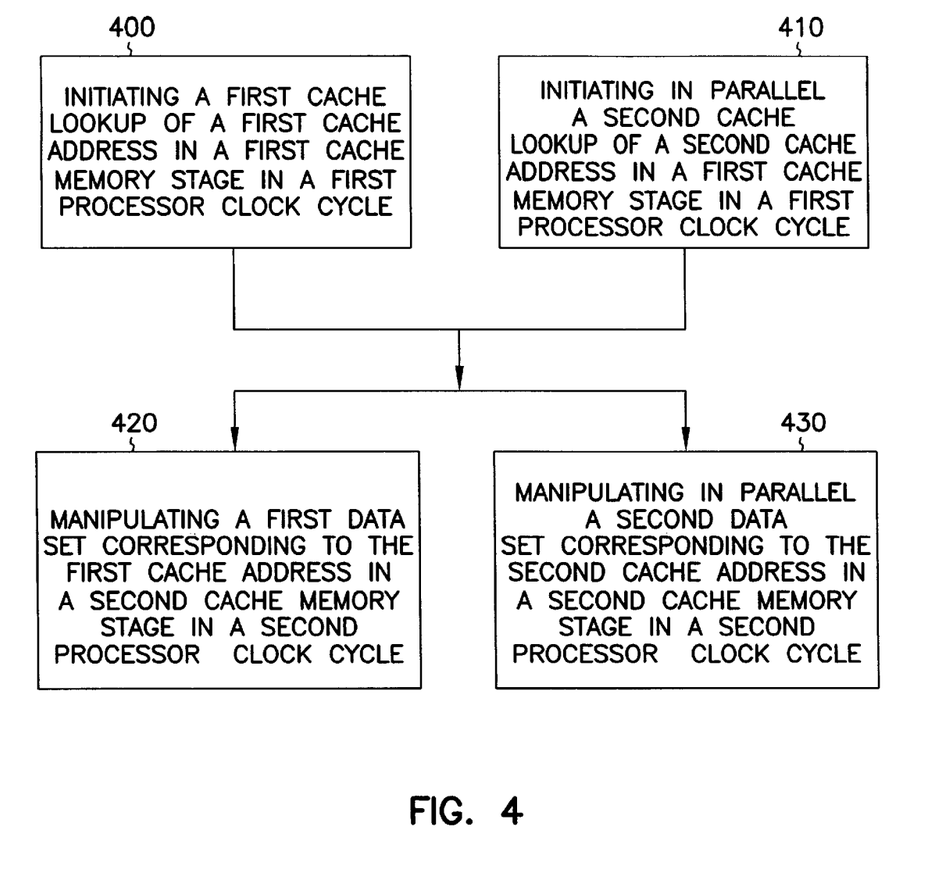
FIG. 4 illustrates, in flow diagram form, a method for storing and retrieving data from a cache memory according to the teachings of the present invention.

FIG. 4 illustrates, in flow diagram form, a method for storing and retrieving data from a cache memory according to the teachings of the present invention. As shown in FIG. 4 the method includes initiating a first cache lookup of a first cache address in a first cache memory stage in a first processor clock cycle 400. A second cache lookup of a second cache address is initiated in parallel in the first cache memory stage in the first processor clock cycle 410. The method further includes manipulating a first data set corresponding to the first cache address in a second cache memory stage in a second processor clock cycle 420. And, the method includes manipulating in parallel a second data set corresponding to the second cache address in the second cache memory stage in the second processor clock cycle 430.

In one embodiment of the method of FIG. 4, the method further includes outputting a first manipulated data set to a first data bus in the second processor clock cycle. In another embodiment, the method further includes outputting a first manipulated data set and a second manipulated data set to a functional unit in the second processor clock cycle. In this embodiment the first manipulated data set is output to a first arithmetic logic unit (ALU) or first register file in the second processor clock cycle and the second manipulated data set is output to a second arithmetic logic unit (ALU) or second register file in the second processor clock cycle.

In still another embodiment of the method of FIG. 4, the method further includes initiating two cache lookups at the first cache memory stage at each cycle of a processor clock.

The present invention includes a novel cache design and method that allows two cache requests to be processed simultaneously (dual-ported) and concurrent cache requests to be in-flight (pipelined). The design of the cache allocates the first cycle to cache tag and data access and the second cycle is allocated to data manipulation. The memory array circuit design is simplified because the cache lookup circuits and the data manipulation circuits are synchronized to the main processor clock and do not need to use self-timed circuits. In addition, by allocating distinct processor clock cycles to the separate functions of cache access and data manipulation the overall logic control scheme for the novel cache memory is simplified.

What is claimed is:
1. A cache memory, comprising:
   a first cache memory stage to access cache data;
   at least two address ports coupled to the first cache memory stage, wherein each of the at least two address ports is to receive an input for a cache address, including a first data address on one port and a second data address on another, wherein the first cache memory stage is to access a first data set and a second data set corresponding to the first data address and the second data address, respectively, on a first clock cycle of a processor clock signal, wherein the first cache memory stage is to receive a new first data set and a new second data set at a consective clock cycle of the processor clock signal; and
   a second cache memory stage, wherein the second cache memory stage is to receive the first data set and the second data set, is to manipulate the first data set and the second data set and to output a first manipulated data set and a second manipulated data set, respectively, to a first arithmetic logic unit (ALU) or a first register file and a second arithmetic logic unit (ALU) or a second register file, respectively, all in a second clock cycle of the processor clock signal.

2. The cache memory of claim 1, wherein the at least two address ports are to receive a first cache address and a second cache address in a same clock cycle.

3. The cache memory of claim 1, wherein the first cache memory stage is to concurrently process a first cache address and a second cache address.

4. The cache memory of claim 1, wherein the cache memory is to pipeline a first cache address and a second cache address.

5. The cache memory of claim 1, wherein a cache lookup function is to occur in a first clock cycle of the processor clock signal, and wherein a cache data manipulation function is to occur in a second clock cycle from the processor clock signal.

6. A microprocessor chip having a processor clock signal, comprising:
   a number of execution units;
   an on-chip cache memory, wherein the on-chip cache memory includes a first cache memory stage wherein the first cache memory stage is to access a first data set and a second data set corresponding to a first data address and a second data address, respectively, in a first processor clock cycle, wherein the first cache memory stage is to access a new first data set and a new second data set at a consecutive clock cycle of the processor clock signal, and a second cache memory stage dedicated to data manipulation wherein the second cache memory stage is to manipulate the first data set and the second data set to produce a first manipulated data set and a second manipulated data set, respectively, in a second processor clock cycle;
   at least two address buses, wherein the at least two address buses to couple the first data address and a second data address from the number of execution units to the on-chip cache memory; and
   at least two data buses, wherein the at least two data buses to couple the first manipulated data set and the second manipulated data set between the on-chip cache memory and the number of execution units in the second processor clock cycle.

7. The microprocessor chip of claim 6, wherein the first cache memory stage includes cache data access circuitry, and wherein the second memory cache stage includes data manipulation circuitry.

8. The microprocessor chip of claim 6, wherein the at least two address buses is to deliver a cache tag and a data access for a first cache line and a second cache line from the first cache memory stage in the first processor clock cycle, and wherein the second cache memory stage is to receive the first data set and the second data set for data manipulation in the second cache memory stage in the second processor clock cycle.

9. The microprocessor chip of claim 8, wherein the second cache memory stage is to output the first manipulated data set and the second manipulated data set in the second processor clock cycle.

10. A computer system, comprising:
    a microprocessor chip having a processor clock signal, comprising:
      a number of execution units;
      an on-chip cache memory, wherein the on-chip cache memory includes a first cache memory stage and a second cache memory stage, wherein the second cache memory stage is dedicated to data manipulation, and wherein the first cache memory stage and the second cache memory stage are synchronized by the processor clock signal, such that the second cache memory stage is to output a first manipulated data set to a first arithmetic logic unit (ALU) or a first register file and a second manipulated data set to a second arithmetic logic unit (ALU) or a second register file within two processor clock signals, and wherein the first cache memory stage is to access a new first data set and a new second data set at a consecutive clock cycle of the processor clock signal;
      at least two address buses, wherein the at least two address buses are to couple address data from the number of execution units to the on-chip cache memory; and
      at least two data buses, wherein the at least two data buses are to couple data sets between the on-chip cache memory and the number of execution units;
    a memory chip; and
    a bus, wherein the bus is to couple the memory chip to the microprocessor chip.

11. The computer system of claim 10, wherein the at least two address busses are to provide a first data address and a second data address to the first cache memory stage in a same clock cycle.

12. The computer system of claim 10, wherein a first one of the at least two data busses is to couple the first manipulated data set with one of the number of execution units, and wherein a second one of the at least two data busses is to couple the second manipulated data set with another one of the number of execution units in a same clock cycle.

13. The computer system of claim 10, wherein the first cache stage includes cache data access circuitry, and wherein the second cache stage includes data manipulation circuitry.

14. The computer system of claim 13, wherein the first cache memory stage is aligned to a first processor clock cycle, and wherein the second cache memory stage is aligned to a second processor clock cycle.

15. A method for accessing a cache memory, comprising:
    receiving a first cache address into a first cache memory stage at a first address port in a first clock cycle;
    receiving a second cache address into the first cache memory stage at a second address port in the first clock cycle;
    delivering a first data set corresponding to the first cache address to a second cache memory stage in a second clock cycle;
    delivering a second data set corresponding to the second cache address to the second cache memory stage in the second clock cycle;
    wherein the second cache memory stage is dedicated to data manipulation, such that the second cache memory stage outputs a first manipulated data set to a first arithmetic logic unit (ALU) or a first register file and a second manipulated data set to a second arithmetic logic unit (ALU) or a second register file within two processor clock signals; and
    wherein the method includes receiving a new first data set and a new second data set at each clock cycle of the processor clock signal at the first cache memory stage.

16. The method of claim 15, wherein receiving a first cache address and a second cache address in the first clock cycle includes aligning the first clock cycle to a processor clock.

17. The method of claim 15, wherein receiving the first cache address into the first cache memory stage includes accessing a first data address in the first clock cycle, and wherein receiving the second cache address into the first cache memory stage includes accessing a second data address in the first clock cycle.

18. The method of claim 15, wherein delivering the first data set corresponding to the first cache address to the second cache memory stage includes manipulating the first data set in the second clock cycle, and wherein delivering the second data set corresponding to the second cache address to the second cache memory stage includes manipulating the second data set in the second clock cycle.

19. The method of claim 15, wherein the method further includes pipelining a first cache line from a first execution unit to the on-chip cache memory with a second cache line from the first execution unit.

20. A method for storing and retrieving data from a cache memory, comprising:

initiating a first cache lookup of a first cache address in a first cache memory stage in a first processor clock cycle;

initiating in parallel a second cache lookup of a second cache address in the first cache memory stage in the first processor clock cycle;

manipulating a first data set corresponding to the first cache address in a second cache memory stage in a second processor clock cycle, such that the second cache memory stage outputs a first manipulated data set to a first arithmetic logic unit (ALU) or a first register file within two processor clock signals;

manipulating in parallel a second data set corresponding to the second cache address in the second cache memory stage, such that the second memory stage outputs a second manipulated data set to a second arithmetic logic unit (ALU) or a second register file within two processor clock signals; and wherein the method includes receiving a new first data set and a new second data set at each clock of the processor clock signal at the first cache memory stage.

21. The method of claim 20, wherein the method further includes outputting a first manipulated data set to a first data bus in the second processor clock cycle.

22. The method of claim 20, wherein the method further includes outputting a first manipulated data set and a second manipulated data set to a functional unit in the second processor clock cycle.

23. The method of claim 20, wherein the method further includes initiating two cache lookups at the first cache memory stage at each cycle of a processor clock.

* * * * *

UNITED STATES PATENT AND TRADEMARK OFFICE
CERTIFICATE OF CORRECTION

PATENT NO. : 6,427,191 B1
DATED : July 30, 2002
INVENTOR(S) : John Wai Cheong Fu, Dean A. Mulla and Gregory S. Mathews It is certified that error appears in the above-identified patent and that said Letters Patent is hereby corrected as shown below:

<u>Title page,</u>
Item [74], *Attorney, Agent, or Firm*, insert -- , -- after "Kluth".

Signed and Sealed this

Third Day of June, 2003

JAMES E. ROGAN
*Director of the United States Patent and Trademark Office*